(12) United States Patent
Gerharter et al.

(10) Patent No.: US 7,187,840 B2
(45) Date of Patent: Mar. 6, 2007

(54) REPRODUCING ARRANGEMENT HAVING AN OVERVIEW REPRODUCING MODE

(75) Inventors: Herbert Gerharter, Haus (AT); Andras Kalmar, Rannersdorf (AT); Hannes Riedl, Vienna (AT); Bruce D. Thomas, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1102 days.

(21) Appl. No.: 09/940,047

(22) Filed: Aug. 27, 2001

(65) Prior Publication Data
US 2002/0067908 A1 Jun. 6, 2002

(30) Foreign Application Priority Data
Aug. 28, 2000 (EP) .................. 00890261

(51) Int. Cl.
*H04N 5/91* (2006.01)
(52) U.S. Cl. .............. 386/46; 386/125; 386/1; 386/52; 386/68; 386/81; 386/82; 386/6; 386/7; 386/8
(58) Field of Classification Search ............ 386/1, 386/6–8, 46, 68, 81–82, 52
See application file for complete search history.

(56) References Cited

FOREIGN PATENT DOCUMENTS

| DE | 19946727 A | | 9/1998 |
| EP | 0 724 211 A2 | * | 1/1996 |
| EP | 0724211 | | 7/1996 |
| EP | 0 915 469 A2 | * | 11/1998 |
| EP | 0915469 A2 | | 11/1998 |

* cited by examiner

*Primary Examiner*—Thai Q. Tran
*Assistant Examiner*—Helen Shibru

(57) ABSTRACT

A reproducing arrangement for reproducing scenes of a stored film in an overview reproducing mode of the reproducing arrangement, has random access memory means for the storage of audio/video data (AVD) of a film which is reproducible at a normal reproducing speed during a film reproduction time (TW1, TW2), and mode means which enable the overview reproducing mode of the reproducing arrangement to be activated, at least two scenes of the stored film being reproduced in succession at the normal or an increased reproducing speed by the reproducing arrangement in the overview reproducing mode, and a skip scene recorded between two scenes and reproducible at the normal reproducing speed during a skip reproduction time interval not being reproduced in the overview reproducing mode.

19 Claims, 2 Drawing Sheets

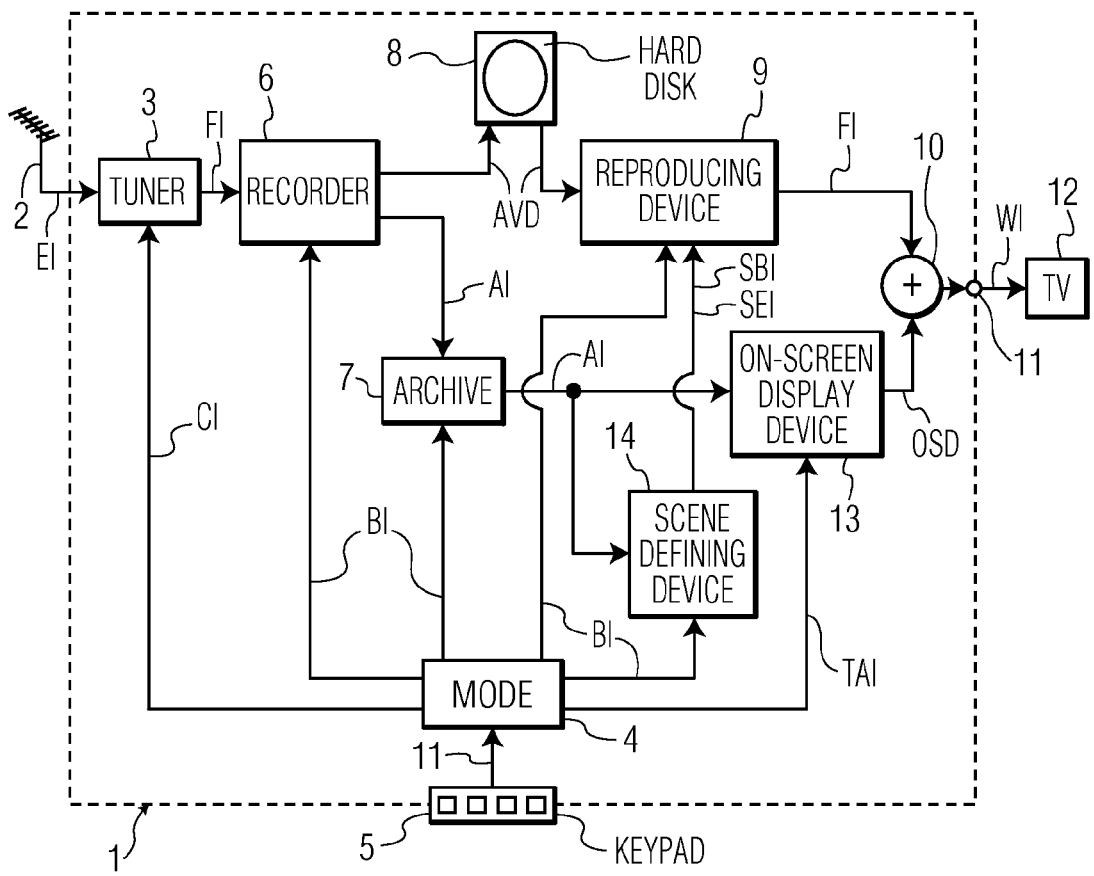
FIG. 1
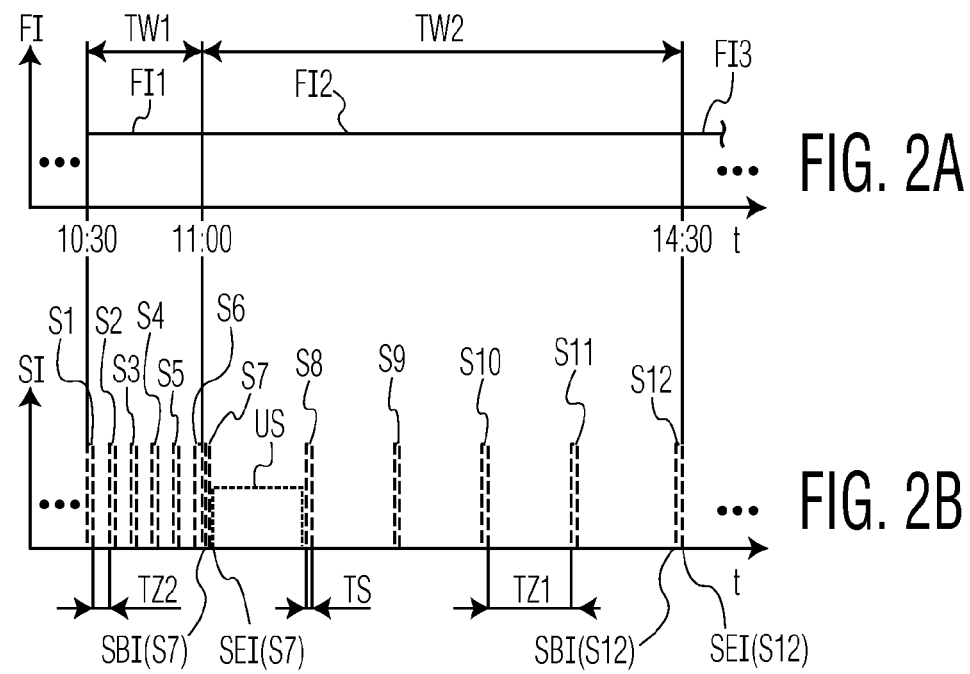
FIG. 2A
FIG. 2B

REPRODUCING ARRANGEMENT HAVING AN OVERVIEW REPRODUCING MODE

The invention relates to a reproducing arrangement for reproducing scenes of a stored film in an overview reproducing mode of the reproducing arrangement, having random access memory means for the storage of audio/video data of a film which is reproducible at a normal reproducing speed during a film reproduction time, and having mode means which enable the overview reproducing mode of the reproducing arrangement to be activated, at least two scenes of the stored film being reproduced in succession at the normal or an increased reproducing speed by the reproducing arrangement in the overview reproducing mode, and a skip scene recorded between two scenes and reproducible at the normal reproducing speed during a skip reproduction time interval not being reproduced in the overview reproducing mode, and having reproducing means which, in the overview reproducing mode of the reproducing arrangement, are adapted to reproduce the stored audio/video data of the film at the normal reproducing speed from scene start positions to scene end positions during scene reproduction times.

The invention relates to an overview reproducing method for reproducing scenes of a stored film in an overview reproducing mode of a reproducing arrangement which carries out the overview reproducing method, the overview reproducing method comprising the following steps:

reproducing stored audio/video data of a film at a normal reproducing speed during a film reproduction time, successively reproducing at least two scenes of the stored film at the normal or an increased reproducing speed during a film reproduction time interval while the reproducing arrangement is in the overview reproducing mode, each of the reproduced scenes being reproduced from a scene start position to a scene end position during a scene reproduction time and a skip scene recorded between two scenes and reproducible at the normal reproducing speed during a skip reproduction time interval not being reproduced in the overview reproducing mode.

Such a reproducing arrangement and such an overview reproducing method are known from the document EP 0 724 211 A2. The known reproducing arrangement is formed by a computer that executes software for the reproduction of scenes of a stored film in accordance with an overview reproducing method. Mass memories formed by computer servers store audio/video data of a multitude of films.

The known overview reproducing method makes it possible for a user—such as for example a journalist—to obtain a rapid overview of the contents of the films stored on the computer servers. To this end, the user can define a starting instant, a scene reproduction time interval and a skip reproduction time interval. Reproducing means of the reproducing arrangement subsequently reproduce the user-selected scenes of the stored films, reproduction of the skip scenes stored between the reproduced scenes being omitted.

When the user defines 5 seconds for the scene reproduction time interval and nine minutes and 55 seconds for the skip reproduction time interval, a scene having a length of 5 seconds of every ten minutes film reproduction time will be reproduced by the computer in the overview reproducing mode. Thus, in the overview reproducing mode the user will see 18 scenes having a length of 5 seconds each in the case of a film (for example, Casablanca) having a film reproduction time of three hours. However, in the case of a film (for example, a screen documentary with ten contributions) having a film reproduction time of 30 minutes the viewer will see only 3 scenes having a length of 5 seconds each in the overview reproducing mode. The sum of the scene reproduction time intervals, which corresponds to a film overview time, is consequently one minute and 30 seconds for the film "Casablanca" and only 15 seconds for the screen documentary with ten contributions.

With the known reproducing arrangement and the known overview reproducing method it has therefore proved a disadvantage that in the case of long films the user sees comparatively many film scenes and in the case of short films the user only sees comparatively few film scenes and has an unsatisfactory overview of the contents of short films. Furthermore, it has proved to be a disadvantage that the user should manually define the scenes to be reproduced in the overview reproducing mode.

It is an object of the invention to provide a reproducing arrangement of the type defined in the first paragraph and an overview reproducing method of the type defined in the second paragraph, which preclude the aforementioned disadvantages. In such a reproducing arrangement this object is achieved by the provision of scene defining means adapted to autonomously define the scenes of a stored film which are to be reproduced by the reproducing means in the overview reproducing mode, the sum of the scene reproduction times defined for a stored film by the scene defining means 14 essentially corresponding to always the same film overview reproduction time also in the case of different film reproduction times of the stored films.

With such an overview reproducing method said object is achieved by the provision of the following method step:

autonomously defining the scenes of a stored film which are to be reproduced in the overview reproducing mode, the sum of the scene reproduction times defined for a stored film essentially corresponding to always the same film overview reproduction time interval also in the case of different film reproduction times of the stored films.

This has the advantage that a user of the reproducing arrangement is given an overview of the content of a stored film during substantially always the same film overview reproduction time. This yields, for example, a "movie in a minute" feature for a reproducing arrangement, where the user of the reproducing arrangement is given an impression of the content of a long as well as a short stored film in a film overview reproduction time interval of one minute.

The measures as defined in claim 2 and in claim 10 have the advantage that the user can define whether he wishes to have only a superficial or a more comprehensive overview of each stored film by a single entry of the film overview reproduction time interval.

The measures as defined in claim 3 have the advantage that the scene defining means do not define any scene reproduction time intervals that are too short (for example 1 second) to give an impression of the relevant scene.

The measures as defined in claim 4 and in claim 11 have the advantage that for the user of the reproducing arrangement a list of all the films stored with the random access memory means is displayed on a television set connected to the reproducing arrangement. When the user now marks one after the other of the displayed titles, a brief summary of the relevant film will be displayed automatically as the background of the displayed titles. This will be expounded on with reference to the embodiment given by way of example.

The measures as defined in claim 5 have the advantage that with the aid of the display of the scene reproduction position information the user directly recognizes whether a scene reproduced in the overview reproducing mode stems from the beginning, the middle or the end of a film.

The measures as defined in claim 6 and claim 12 have the advantage that the scene defining means do not define any scenes from commercial breaks and reproduce these in the overview reproducing mode. Indeed, such scenes would not give an impression of the content of the stored film.

The measures as defined in claim 7 and claim 13 have the advantage that the scene defining means define for the overview reproducing mode those scenes which appear in the film directly before a change of scene in the film, directly after a change of scene in the film or also a given reproduction time interval after a change of scene in the film.

The invention will now be described, by way of example, with reference to an embodiment which is shown in the Figures but to which the invention is not limited.

FIG. 1 shows a hard-disk recorder which, in an overview reproducing mode, is adapted to reproduce some scenes of a film stored by means of the hard-disk recorder.

FIGS. 2 show symbolically the film information of two films stored by the hard-disk recorder and the scenes reproduced by the hard-disk recorder in the overview reproducing mode.

FIG. 1 shows a hard-disk recorder 1 which forms a recording and reproducing arrangement for recording or storing, and for reproducing or reading film information FI of a film or a television program. The film information FI includes picture information and sound information of the film or television program.

Figure 3:
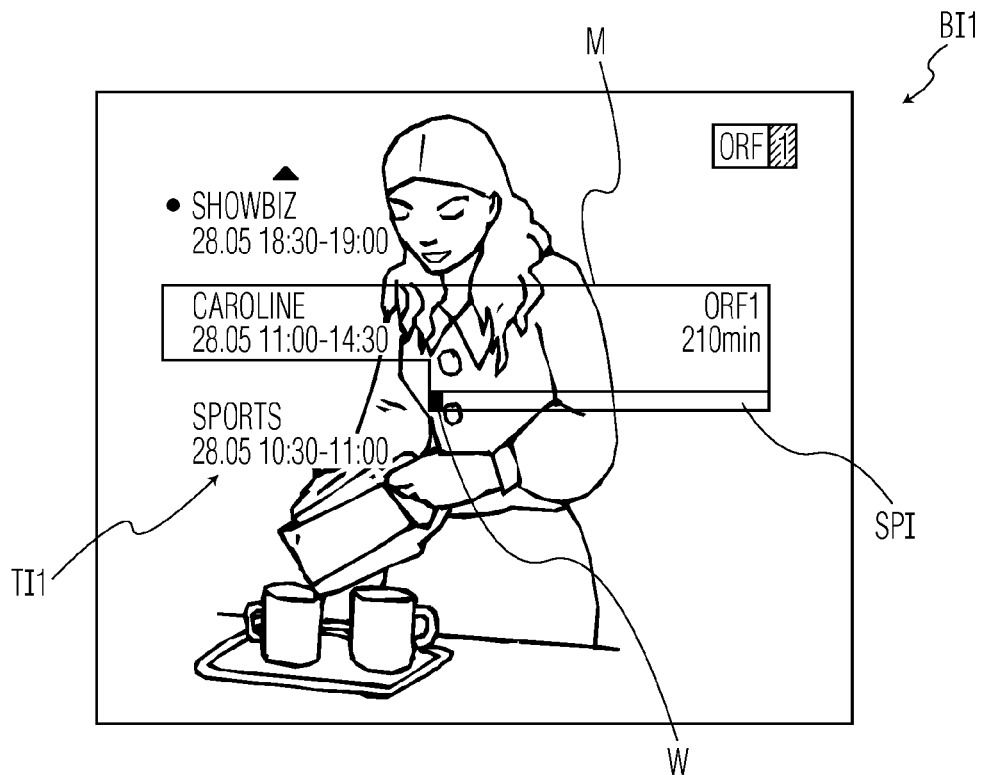
FIG. 3 shows the reproduction information displayed by a television set connected to the hard-disk recorder, which information includes a list of titles of the films stored by the hard-disk recorder and, in the background of this list, a scene of the film whose title has been marked by the user, which scene is reproduced in the overview reproducing mode.

The film information FI may also include additional information such as the title of the film, the date at which the film is broadcast, start and end times of the film, as well as a summary of the film. Such additional information may be contained in analog film information FI as teletext information in hidden lines of the television signal or as an "Electronic Program Guide", for example in accordance with the ETS 300 707 standard. However, such additional information may also be contained in digital film information which is received via a digital television channel and which, for example, complies with the MPEG standard.

From an antenna 2 an antenna signal can be applied as reception information EI to the hard-disk recorder 1. In a plurality of frequency bands or receiving channels the antenna signal contains analog television signals from television stations, which signals contain the film information FI of films. In a first receiving channel the hard-disk recorder 1 receives television programs of the television station ORF1.

The hard-disk recorder 1 includes a tuner 3, mode means 4 and a keypad 5. With the aid of the keypad 5 a user of the hard-disk recorder 1 can activate and deactivate modes of operation of the hard-disk recorder 1. In addition to the modes of operation which are not relevant here, the hard-disk recorder 1 can be set to a recording mode, a reproducing mode, an overview reproducing mode and a selection mode. The keypad 5 can supply corresponding input information II to the mode means 4.

The mode means 4 are adapted to supply mode information BI corresponding to the input information II to further means provided for this purpose in the hard-disk recorder 1. The mode means 4 also enable the overview reproducing means of the hard-disk recorder 1 to be activated, in which overview reproducing mode of the hard-disk recorder 1 at least two scenes S of a film stored with the hard-disk recorder 1 can be reproduced in succession at the normal reproducing speed during a film overview reproduction time interval TU. A skip scene US, recorded between two scenes S during a skip reproduction time interval TZ and reproducible at the normal reproducing speed, is then not reproduced during the overview reproducing mode. The hard-disk recorder 1 then carries out an overview reproducing method for the reproduction of scenes of a stored film. The overview reproducing mode will be described in further detail hereinafter.

By means of the keypad 5 a user can also enter input information II, which identifies the receiving channel whose television signal is should be selected from the reception information EI by the tuner 3 and should be supplies as film information FI. Channel information CI identifying the receiving channel can be applied from the mode means 4 to the tuner 3.

The hard-disk recorder 1 further includes recording means 6, to which the film information FI supplied by the tuner 3 can be applied. The recording means 6 include a signal processing stage, an analog/digital converter and further stage required for processing the analog television signal and supplying audio/video data A/V data A/D that can be recorded on a hard disk. The recording means 6 further include a read-out stage adapted to read the additional information contained in the film information FI and to supply the read-out additional information as archive information AI associated with the recorded audio/video data A/V data A/D. Such recording means 6 having a teletext IC as read-out stage are commonly known, for which reason they are described in greater detail.

The hard-disk recorder 1 further includes archive means 7 to which the archive information AI read by the read-out stage of the recording means 6 can be applied. The archive means 7 include an EEPROM and are adapted to store the archive information AI supplied by the read-out stage.

The hard-disk recorder 1 further has a hard disk 8, which forms the random access memory means and which in the recording mode of the hard-disk recorder 1 is adapted to store the audio/video data AVD of a film which is reproducible at the normal reproducing speed during a film reproduction time interval TW. The manner in which the audio/video data AVD are stored in sectors on the hard disk 8 is also commonly known, for which reason this is not described in further detail.

The hard-disk recorder 1 further has reproducing means 9 which in the reproducing mode of the hard-disk recorder 1 are adapted to reproduce the audio/video data AVD stored by means of the hard disk 8, the reproduced film being reproduced at the normal reproducing speed during the film reproduction time interval TW. In the overview reproducing mode of the hard-disk recorder 1 the reproducing means 9 are adapted to reproduce the stored audio/video data AVD of the film at the normal reproducing speed from scene start positions SBI up to scene end positions SEI during scene reproduction time intervals TS. This will be described in greater detail with reference to the example of use of the hard-disk recorder 1.

In the reproducing mode and in the overview reproducing mode of the hard-disk recorder 1 the reproducing means 9 can supply the film information FI contained in the reproduced audio/video data AVD to an output terminal 11 via an adder stage 10. The film information FI supplied to the output terminal 11 can be applied as reproduction information WI to a television set 12 connected to the output terminal 11.

The hard-disk recorder 1 further has OSD means 13 adapted to supply OSD information OSD to the adder stage 10. The adder stage 10 is adapted to superpose text information TI contained in the OSD information OSD on the film information FI supplied by the reproducing means 9.

By actuating an archive key of the keyboard 5 the user can activate the selection mode of the hard-disk recorder 1, in which mode, as is shown in FIG. 3, the title, the recording start time, the recording end time and the recording date of films stored by means of the hard-disk recorder 1 can be displayed by the television set 12. Upon reception of such input information II the mode means 4 supply title read-out information TAI to the OSD means 13, which in response thereto read the corresponding archive information AI from the archive means 7 and supply it to the adder means 10 as OSD information OSD.

The hard-disk recorder now further has scene defining means 14 for autonomously defining the scenes of a stored film to be reproduced by the reproducing means 9 in the overview reproducing mode, the sum of the scene reproduction time intervals TS defined for a stored film by the scene defining means 14 essentially corresponding to always the same film overview reproduction time TU also in the case of different film reproduction times TW.

In the overview reproducing mode information BI characterizing this mode can be applied to the scene defining means 14, upon which the scene defining means 14 are adapted to read the archive information AI from the archive means 7. By subtracting the recording end time contained in the archive information AI from the recording start time the scene defining means 14 determine the film reproduction time TW of the film selected for the overview reproducing mode. The further steps for autonomously defining the scenes S to be reproduced in the overview reproducing mode with the scene defining means 14 will be elucidated with the aid of the following examples of use of the hard-disk recorder.

In the first example of use of the hard-disk recorder 1 it is assumed that on May 28 at 10:30 the user activates the recording mode of the hard-disk recorder 1 by the actuation of a recording key of the keypad 5, upon which first film information FI1 of the television program "SPORTS" of the television station ORF1, which information is supplied by the tuner 3, is recorded on the hard disk 8. During the recording of the television program "SPORTS" the teletext information transmitted in hidden lines of the television signal is read by the read-out stage and the title information TI="SPORTS" is determined as the title of the recorded television program and is stored, together with the recording start time and the recording data, as archive information AI by the archive means 7.

The television program "SPORTS" ends at 11:00, upon which second film information FI2 of a television program "CAROLINE" is transmitted in the television signal of the television station ORF1. The recording means 6 detect the change of a VPS code received in hidden lines of the television signal, thus detecting the start of a new television program. Subsequently, the read-out stage reads the title "CAROLINE" of the television program as title information TI from the teletext information and supplies it to the archive means 7 as archive information AI. The archive means 7 further store the clocktime 11:00 as the recording end time of the television program "SPORTS" and as recording start time of the television program "CAROLINE". At 14:30 the user stops the recording mode by actuating a stop key of the keypad 5, upon which this clock time is stored by the archive means 7 as the recording end time of the second film information FI2 of the television program "CAROLINE".

Finally, the user again activates the recording mode on May 28 from 18:30 till 19.00 and records third film information FI3 of a television program entitled "SHOWBIZ" on the hard disk 8. The archive information AI of this television program is also stored in the archive means 7. FIG. 2a symbolically shows the film information FI recorded by the hard-disk recorder 1. The first film information FI1 has a first film reproduction time TW1 and the second film information FI2 has a second film reproduction time TW2.

In the first example of use it is further assumed that the film overview reproduction time interval TU is defined as one minute in the scene defining means 7, as a result of which a "movie in a minute" feature is obtained. In the overview reproducing mode scenes S of each time one stored film are reproduced in one minute with the "movie in a minute" feature.

Furthermore, it has been defined in the scene defining means 7 that each scene S reproduced in the overview reproducing mode has a scene reproduction time TS of ten seconds. As a result of this, it is achieved that in the overview reproducing mode of each film 6 scenes each having a scene reproduction time TS of ten seconds are reproduced in the film overview reproduction time TU of one minute.

In the first example of use it is now further assumed that on May 30 the user has time to watch television and wants to see one of the films recorded by means of the hard-disk recorder 1. The user actuates the archive key of the keypad 5 in order to select one of the stored films. Subsequently, the mode means 4 activate the selection mode and the title read-out information TAI is supplied to the OSD means 13. The OSD means then read the information stored in the archive means 7 (title information TI, recording date, recording start time, recording end time) for the films stored on the hard disk 8 and supply this information as OSD information OSD to the television set 12. The television set 12 display this OSD information as first text information TI1, as is shown in FIG. 3.

The user of the hard-disk recorder 1 now browses the list of titles of stored films by actuating an UP key and a DOWN key of the keypad 5. Each time one of the titles is thus marked with a marking M. The titles thus marked during browsing are defined as selected titles by mode means 4 and the mode means 4 activate the overview reproducing mode for the film information FI of the selected title.

In the first example of use shown in FIG. 3 the title "CAROLINE" of the second film information FI2 has been marked. The mode means 4 then activate the overview reproducing mode for the second film information FI2, upon which the scene defining means 14 start with the autonomous definition of the scenes S7 to S12 to be reproduced. FIG. 2B represents the scene information SI reproduced for film information FI in the overview reproducing mode.

In a first step the scene defining means 14 detect that the second film information FI2 of the film "CAROLINE" can be reproduced in a film reproduction time TW=210 minutes at the normal reproducing speed. The scene defining means 14 now define the scene start position SBI (S7) of the scene S7 to be reproduced for the second film information FI2 at the recording start position of the second film information FI2. The scene defining means 14 further define the scene end position SEI (S12) of the sixth scene S12 for the second film information FI2 at recording end position of the second film information FI2. The scene start positions SBI and the scene end positions SEI of the second scene S8, the third scene S9, the fourth scene S10 and the fifth scene S11 to be reproduced for the second film information FI2 are defined by the scene defining means 14 so as to obtain always the same skip reproduction time interval TZ1 of 41 minutes and 48 seconds between the scenes S7 to S12.

The scene defining means 14 subsequently supply the scene start positions SBI and the scene end positions SEI of the six scenes S7 to S12, which have been defined autonomously by the scene defining means 14 in the manner described hereinbefore, to the reproducing means 9. Subsequently, the reproducing means 9 start with the reproduction of the six scenes S7 to S12 identified by the scene start positions SBI and the scene end positions SEI.

The "movie in a minute" feature has the advantage that the user of the hard-disk recorder 1 can browse through the list of titles of stored films and at the same time sees six scenes of the titles just marked. Thus, with the aid of the title and the scenes S of the film the user can decide whether the film is interesting for him and whether he wishes to view the whole film.

In the first example of use of the hard-disk recorder 1 the user watches the first three scenes S7, S8 and S9 of the film "CAROLINE" in the overview reproducing mode and decides that the film does not interest him. By actuating the DOWN key the user subsequently marks the title "SPORTS" of the first film information FI1. Subsequently, the scene defining means 14 define, as described hereinbefore, the scene start positions SBI and the scene end positions SEI of the six scenes S1 to S6 to be reproduced for the first film information FI1 in the overview reproducing mode. The scene defining means 14 then define five minutes and 48 seconds for the skip reproduction time interval TZ2.

This has the advantage that both for the film "CAROLINE" having a length of three hours and 30 minutes and for the short film "SPORTS" of only 30 minutes length film scenes for giving an impression of the contents of the films are reproduced during the same overview reproduction time TU=1 minute. Since in particular short films such as, for example, sports reports, news and other reports have widely varying contents, the overview reproduction time TU of a comparatively great length in relation to the film length leads to a very good overview of the short film.

The OSD means 13 of the hard-disk recorder 1 now form output means for the output of scene reproduction position information SPI which identifies the position in the film of the scene to be reproduced in the overview reproducing mode. The OSD means 13 then generate a bar as shown in FIG. 3, whose frame symbolizes the film reproduction time TW of the marked film "CAROLINE" and whose white portion W marks the position of the first scene S7 of the second film information FI2, which scene is now being reproduced in the overview reproducing mode.

This has the advantage that the user also receives the additional information about the position of the scenes S being reproduced. Thus, the user can thus discern the position of an interesting item in a film and can subsequently also locate this item in the film more easily.

The user of the hard-disk recorder 1 can now also define another film overview reproduction time TU than that originally defined in the scene defining means 14. For this purpose, the user enters the desired new film overview reproduction time TU by means of keys of the keypad 5 and actuates a store key of the keypad.

This has the advantage that a user who wishes to spend very little time for the selection of one of the stored films can set the film overview reproduction time TU to, for example, 30 seconds. Likewise, a user can set the film overview reproduction time TU to, for example, 3 minutes if he wishes to have more information about a stored film before he decides to view the entire film.

It is to be noted that scene defining means may alternatively define the scenes to be reproduced in the overview reproducing mode in an entirely other manner than described hereinbefore. To define the scenes the number of scenes per film may then always be the same but a scene reproduction time TS of, for example, 1.5 seconds or 30 seconds may be adopted. Likewise, the scenes of a film may be defined with different scene reproduction times TS but with the film overview reproduction time TU being always substantially equal for each film.

However, it is particularly advantageous to make the scene reproduction time TS always longer than one minimum scene reproduction time TM of, for example, one second because in the case of scenes having a scene reproduction time TS shorter than one second it is difficult for a user to grasp the contents of these scenes.

Likewise, when the scenes are defined by the scene defining means the skip reproduction time interval TZ may be made substantially equal for each film and the number of scenes S to be reproduced in the overview reproduction mode as well as their scene reproduction times TS may be adapted accordingly. Furthermore, it is certainly not necessary to define always an equal skip reproduction time interval TZ between the scenes of a film.

When in the selection mode the picture information BI1 shown in FIG. 3 is supplied as reproduction information WI by the hard-disk recorder, 1 the user can actuate an info key of the keypad 5 to have the summary of the film whose title is marked displayed by means of the television set 12. This summary is read from the archive means 7 and is displayed as text information by means of the television set 12.

In a second example of use of the hard-disk recorder 1 the user actuates the info key in order to display the summary of the film entitled "AKTE X" (X FILE). In response thereto, the OSD means 13 read the text information TI2 from the memory of the archive means 7 and supply this as reproduction information WI to the television set 12. The television set 12 subsequently displays the picture information BI2 shown in FIG. 4.

Figure 4:
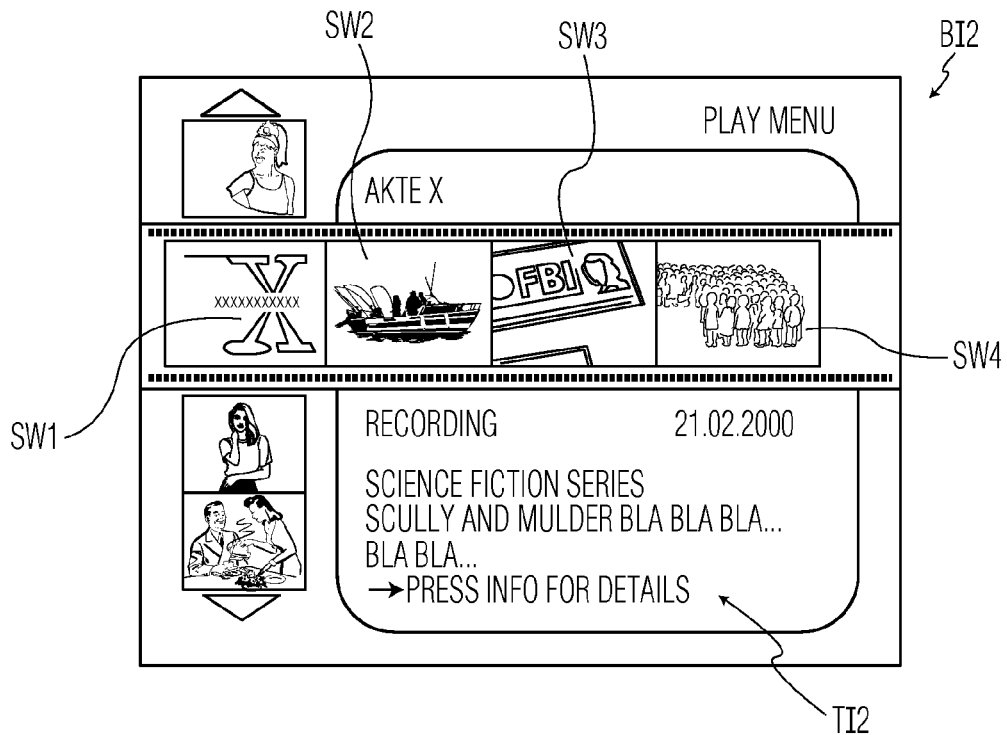
FIG. 4 shows the reproduction information displayed by the television set connected to the hard-disk recorder, which information includes a title of a film stored by the hard-disk recorder as well as a summary of this film and, in the background of this list, four scenes of the film reproduced in the overview reproducing mode.

The picture information BI2 shown in FIG. 4 further has four scene reproduction areas SW1, SW2, SW3 and SW4. In these scene reproduction areas the scenes S defined by the scene defining means 14 are now reproduced in parallel, i.e. at the same time. Thus, the scene defining means 14 may have defined four scenes S of the film "AKTE X" for the overview reproducing mode, which scenes are continually repeated in the scene reproduction areas after expiry of the scene reproduction time TS. Likewise, more than four scenes S may be defined by the scene defining means 14, which are then reproduced alternately in the scene reproduction areas, each time four in parallel, i.e. at the same time.

This has the advantage that the user very rapidly obtains an impression of the content of a stored film. Thus, for example 20 scenes each having a scene reproduction time TS of three seconds with a film overview time TU of one minute could be reproduced in only 15 seconds.

It is to be noted that a reproducing arrangement in accordance with the invention may also include commercial-break detection means for the detection of commercial breaks in the stored audio/video data AVD. Such commercial-break detection means have been known for a longer time and, for example, utilize the fact that many broadcasting stations suppress the logo during commercial breaks.

In such a reproducing arrangement having commercial break detection means it is particularly advantageous when the scene defining means are adapted to define the scenes S to be reproduced by the reproducing means in the overview reproducing mode, in such a manner that the commercial breaks appear in the skip scenes US.

Thus, it is advantageously achieved that the scenes S reproduced in the overview reproducing mode actually contain only scenes of the highlighted film and do not contain any scenes of commercial breaks interposed between parts of the film.

It is to be noted that a reproducing arrangement in accordance with the invention may also include scene change detection means for detecting a change of scene in the stored film. Such scene changes can be detected, for example, by a fade-out, which sometimes occurs at the end of a scene, and a fade-in at the beginning of the next scene. Many scene changes in a film can also be detected by the detection of a black frame interposed between scenes of a film.

Since action-packed parts of a film often contain very rapid successions of short scenes it is particularly advantageous if the scene defining means define the stored film scenes to be reproduced by the reproducing means in the overview reproducing mode in dependence on the detected scene change.

It is to be noted that the random access memory means may, for example, also include a DVD which stores the audio/video data AVD of films and, optionally, also additional information about the films. Likewise, the random access memory means may be constituted by a flash RAM.

It is to be noted that the film overview reproduction time intervals for each film need not have exactly the same length. Thus, deviations in the film overview reproduction time intervals of films of, for example, up to 20% are still regarded as substantially equal.

It is to be noted that scene defining means in accordance with the invention may also be adapted to autonomously define scene start positions and scene end positions of scenes which in the overview reproducing mode are reproduced at 2 times, 4 times or 20 times the reproducing speed. On the basis of the above-described method of determining scene start positions and scene end positions of scenes for an overview reproducing mode at 1 time the reproducing speed it will also be feasible for one skilled in the art to determine such scene start positions and scene end positions for scenes to be reproduced in the overview reproducing mode at, for example, 2 times, 4 times or 20 times the reproducing speed. This has the advantage that longer scenes can be reproduced in the same film overview reproducing mode and the user obtains a better impression of the contents of stored films.

The invention claimed is:

1. A reproducing arrangement for reproducing scenes of a stored film in an overview reproducing mode of the reproducing arrangement, the arrangement comprising:
    random access memory means for the storage of audio/video data of a film which is reproducible at a normal reproducing speed during a film reproduction time;
    mode means which enable the overview reproducing mode of the reproducing arrangement to be activated, at least two scenes of the stored film being reproduced in succession at the normal or an increased reproducing speed by the reproducing arrangement in the overview reproducing mode, and a skip scene recorded between two scenes and reproducible at the normal reproducing speed during a skip reproduction time interval not being reproduced in the overview reproducing mode;
    reproducing means which, in the overview reproducing mode of the reproducing arrangement, are adapted to reproduce the stored audio/video data of the film at the normal reproducing speed from scene start positions to scene end positions during scene reproduction times;
    scene defining means for autonomously defining the scenes of a stored film which are to be reproduced by the reproducing means in the overview reproducing mode, the sum of the scene reproduction times defined for a stored film by the scene defining means essentially corresponding to always the same film overview reproduction time interval regardless of potentially different film reproduction times the stored films.

2. A reproducing arrangement as claimed in claim 1, wherein input means provided for the manual entry of the film overview reproduction time interval.

3. A reproducing arrangement as claimed in claim 1, wherein the scene defining means are adapted to define scene reproduction times longer than a minimum reproduction time.

4. A reproducing arrangement as claimed in claim 1, wherein output means are adapted to supply title information of the films stored with the random access memory means to a display device connectable to the reproducing arrangement, the mode means, upon the selection of the title information of a stored film by a user of the reproducing arrangement, being adapted to activate the overview reproducing mode of the reproducing arrangement and the reproducing means being adapted to reproduce the scenes defined by the scene defining means for the film corresponding to the selected title information.

5. A reproducing arrangement as claimed in claim 1, wherein the output means are adapted to provide scene reproduction position information characteristic of the position within the film of the scene reproduced in the overview reproducing mode.

6. A reproducing arrangement as claimed in claim 1, wherein commercial break detection means are adapted to detect commercial breaks in the stored audio/video data and wherein the scene defining means are adapted to autonomously define the scenes to be reproduced by the reproducing means in the overview reproducing mode, in such a manner that the commercial breaks appear in skip scenes.

7. A reproducing arrangement as claimed in claim 1, wherein scene change detection means have provided for the detection of a change of scene in the stored film and wherein the scenes of the stored film which are to be reproduced by the reproducing means in the overview reproducing mode are defined by the scene defining means in dependence on the detected scene change.

8. A reproducing arrangement as claimed in claim 1, wherein the random access memory means are formed by at least one of a hard disk an optical disk.

9. An overview reproducing method for reproducing scenes of a stored film in an overview reproducing mode of a reproducing arrangement which carries out the overview reproducing method, the overview reproducing method comprising the following steps:
    reproducing stored audio/video data of a film at a normal reproducing speed during a film reproduction time, successively reproducing at least two scenes of the stored film at the normal or an increased reproducing speed during a film reproduction time interval while the reproducing arrangement is in the overview reproducing mode, each of the reproduced scenes being reproduced from a scene start position to a scene end position during a scene reproduction time and a skip scene recorded between two scenes and reproducible at the normal reproducing speed during a skip reproduction time interval not being reproduced in the overview reproducing mode, autonomously defining the scenes of a stored film which are to be reproduced in the overview reproducing mode, the sum of the scene reproduction times defined for a stored film essentially corresponding to always the same film overview reproduction time interval also in the case of different film reproduction times of the stored films.

10. An overview reproducing method as claimed in claim 9, including the following further step:

processing the film overview reproduction time interval (TU) that has been entered manually by a user of the reproducing arrangement.

11. An overview reproducing method as claimed in claim 9, including the following further steps:

supplying title information (TI) of the stored films to a display device connected to the reproducing arrangement, activating the overview reproducing mode of the reproducing arrangement and reproducing the defined scenes of one of the stored films when the user has selected the title information of this stored film.

12. An overview reproducing method as claimed in claim 9, including the following further steps:

detecting commercial breaks in the stored audio/video data, autonomously defining the scenes to be reproduced in the overview reproducing mode, in such a manner that the commercial breaks appear in skip scenes.

13. An overview reproducing method as claimed in claim 9, including the following further steps:

detecting a change of scene in the stored film, taking into account detected scene chances when autonomously defining the scenes to be reproduced in the overview reproducing mode.

14. A reproducing arrangement for reproducing scenes of a stored film in an overview reproducing mode of the reproducing arrangement, the arrangement comprising:

memory configured to store audio/video data of a film which is reproducible at a normal reproducing speed during a film reproduction time;

a user mode selection adapted to enable the overview reproducing mode of the reproducing arrangement to be activated to display at least two scenes of the stored film reproduced in succession at the normal or an increased reproducing speed by the reproducing arrangement in the overview reproducing mode, and a skip scene recorded between two scenes and reproducible at the normal reproducing speed during a skip reproduction time interval not being reproduced in the overview reproducing mode;

player adapted to reproduce the stored audio/video data of the film at the normal reproducing speed from scene start positions to scene end positions during scene reproduction times in the overview reproducing mode;

scene defining device arranged to autonomously define the scenes of a stored film which are to be reproduced by the player in the overview reproducing mode, the sum of the scene reproduction times defined for a stored film by the scene defining device essentially corresponding to always the same film overview reproduction time interval regardless of potentially different film reproduction times of the stored films.

15. A reproducing arrangement as claimed in claim 14, wherein the user mode selection is arranged to provide for the manual entry of the film overview reproduction time interval.

16. A reproducing arrangement as claimed in claim 14, wherein an output device is adapted to supply title information of the films stored with the memory to a display device connectable to the user mode selection upon the selection of the title information of a stored film by a user of the reproducing arrangement, being adapted to activate the overview reproducing mode of the reproducing arrangement and the player being adapted to reproduce the scenes defined by the scene defining device for the film corresponding to the selected title information.

17. A reproducing arrangement as claimed in claim 14, wherein an output device is adapted to provide scene reproduction position information characteristic of the position within the film of the scene reproduced in the overview reproducing mode.

18. A reproducing arrangement as claimed in claim 14, wherein a commercial break detector is adapted to detect commercial breaks in the stored audio/video data and wherein the scene defining device is adapted to autonomously define the scenes to be reproduced by the player in the overview reproducing mode, in such a manner that the commercial breaks appear in skip scenes.

19. A reproducing arrangement as claimed in claim 1, wherein a scene change detection device is arranged to provide for the detection of a change of scene in the stored film and wherein the scenes of the stored film which are to be reproduced by the player in the overview reproducing mode are defined by the scene defining device in dependence on the detected scene change.

* * * * *